United States Patent [19]

Walter

[11] Patent Number: 5,825,298
[45] Date of Patent: *Oct. 20, 1998

[54] RADIO FREQUENCY TRANSPONDER METHOD FOR IDENTIFYING GEOGRAPHICAL LOCATIONS SUCH AS SURVEY TRAVERSE POINTS

[76] Inventor: Kenneth E. Walter, 8714 W. Bell, Pasco, Wash. 99301

[ * ] Notice: This patent issued on a continued prosecution application filed under 37 CFR 1.53(d), and is subject to the twenty year patent term provisions of 35 U.S.C. 154(a)(2).

[21] Appl. No.: 586,344

[22] Filed: Jan. 16, 1996

[51] Int. Cl.$^6$ .............................. G08B 5/22; G01V 3/08; E01F 9/011
[52] U.S. Cl. .............................. 340/825.54; 340/825.49; 52/103; 324/329
[58] Field of Search ..................... 340/825.54, 825.36, 340/825.49; 52/103; 324/329

[56] References Cited

U.S. PATENT DOCUMENTS

| | | | |
|---|---|---|---|
| 191,919 | 6/1877 | Bonner | 52/103 |
| 3,503,163 | 3/1970 | Lutz | 52/103 |
| 3,836,842 | 9/1974 | Zimmermann et al. | 324/329 |
| 4,594,559 | 6/1986 | Bernzweig | 324/329 |
| 4,864,749 | 9/1989 | Brown | 40/299 |
| 4,890,064 | 12/1989 | Candy | 324/329 |
| 5,214,410 | 5/1993 | Verster | 340/825.54 |
| 5,430,379 | 7/1995 | Parkinson et al. | 324/329 |

*Primary Examiner*—Edwin C. Holloway, III
*Assistant Examiner*—Edward Merz
*Attorney, Agent, or Firm*—Floyd E. Ivey

[57] ABSTRACT

An identification system including a device for locating land and construction survey traverse control points, other survey sites or any location marking the position of a place or thing comprised of a read only or read/write radio frequency transponder enclosed within a durable watertight container including a stake which may be driven into the earth, a read/write reader assembly and, a portable computer. The radio frequency transponder may be written to or read by a non-contacting radio frequency read/write reader assembly. The reader assembly connected to a portable computer through a data interface means such as RS232 or RS422/485. The stake or other container may be buried under any non-metallic material or otherwise not visible as long as it is within the operating range of the reader assembly. Each radio frequency transponder will have a unique identification code imprinted in its memory and, on the read/write transponders, may have additional information written into its memory. The reader assembly requires a 12 vdc power supply which may be self contained or an external battery pack. The transponder requires no power while in the standby non-excited state.

5 Claims, 3 Drawing Sheets

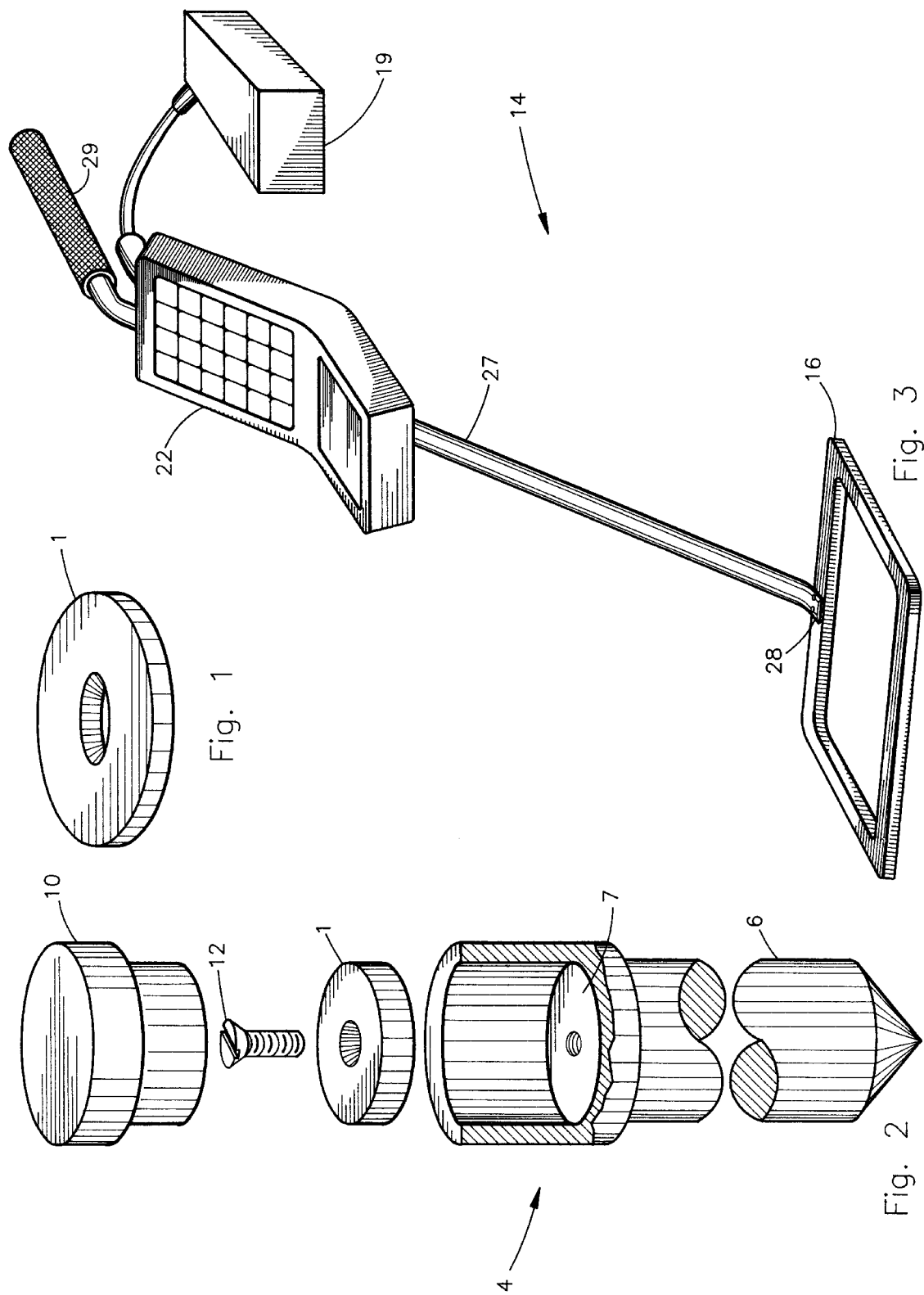

RADIO FREQUENCY TRANSPONDER METHOD FOR IDENTIFYING GEOGRAPHICAL LOCATIONS SUCH AS SURVEY TRAVERSE POINTS

FIELD OF THE INVENTION

The present invention relates generally to marking and identifying geographical locations and the future location of the geographical markers or identifiers and relates in particular to survey and geographical locations including land and construction survey traverse control points wherein the marker or survey stake contains a radio frequency transponder containing a unique identification code and which is located by scanning the marker or survey stake with a reader assembly and a portable computer.

BACKGROUND OF THE INVENTION

Reference points employed for property and construction surveys use survey stakes or markers. Wooden stakes driven into the soil with a tack fixed to the top surface of the stake, to more exactly define a point, are used to center a transit, theodolite or total station machine in locating the vertical axis of the designated angle measuring device. This positioning enables the use of such a device in measuring the horizontal and vertical angles and distance between the fore and back points. Property and construction surveys use this information to determine coordinates for each survey point. The survey marker may incorporate a coded metal tag with properties permitting detection by a metal detector as provided in U.S. Pat. No. 4,864,749 to Brown.

Field markers similar to survey stakes may be utilized to mark the location of materials or subjects covered or buried under soil or other substances. Field markers are used to locate items as varied as municipal utilities, piping and hazardous or toxic wastes, Survey stakes, geological survey markers, field markers and other means of identifying a particular point or location, including a coded metal tab, are either susceptible to inadvertent covering by loose soil or snow, degradation with weather and time or provide limited information or data. The coded metal tab, once located, merely provides a designation which enables an individual to refer to a database containing details of the particular location.

U.S. Pat. No. 4,864,749 to Brown is disclosed in accordance with 37 CFR 1.97.

SUMMARY OF THE INVENTION

In accordance with the present invention, a method is disclosed of marking for the future location and identification of a site including geographic, survey and archeological sites. The method may also be used for crime or accident scenes, mining or mineral claims, toxic or hazardous waste sites and any other geographical location.

The present invention comprises an improvement to known means of marking and later locating and identifying a site by providing a marking method which permits the marking of a site and the remote writing to and reading from the marker of an unique identification code and additional information regarding the character of the site. The preferred embodiment of the disclosure uses a water proof stake or container means which may be composed of a rigid and durable material including, but not limited to, plastic, fiberglass, wood and other materials. A transponder is fixed within the stake or container means which in turn may be implanted, embedded, driven or otherwise installed at a geological site.

The method disclosed further utilizes a battery powered reader assembly, consisting of 1) an antenna and 2) a reader comprised of the following components: a transponder activating pulse transmitting device, a receiving device to respond to information emitted by the transponder in response to the activating pulse, and a memory device sufficient to store the information thus emitted. Where required an additional device, which may be a portable computer, is provided for the purpose of accepting and processing the information emitted from the transponder and for the purpose of writing initial, new or revised information into the transponder memory regarding the site so marked.

The improvement is particularly directed, in the preferred embodiment, to the use of radio frequency transponders including Texas Instruments TIRIS™ transponders Model RI-TRP-R9QL(64 bit read only) and RI-TRP-W9QL which is a 64 bit read/write and RI-TRP-C9QL which has a read only memory of 64 bits and a read/write memory of 16 "pages" with 64 bits on each page giving a total of 1024 bits. These TIRIS™ Texas Instruments transponders are powered by a Radio Frequency pulse from a reader assembly operating at 134.2 kHz, are contained within a non-metallic container(stake). The stake and transponder are sufficiently rugged and durable to withstand being driven into soil and will generally tolerate −25° to +70° C. or higher temperatures after installation at the site.

The transponder system used in this method has three basic parts including a transponder, a reader and an antenna. The transponder memory contains programmed data. To interrogate or read the transponder, the reader, where a Texas Instruments TIRIS™ transponder system is employed, transmits pulses at a rate of approximately 10 pulses per second with the total interrogation or read cycle being less than 100 milliseconds. The transmitted pulse from the reader assembly charges the transponder causing it to emit a modulated signal which carries its data back to the reader assembly. The TIRIS™ transponders are provided in Read Only and Read/Write versions. Read Only transponders contain an unique factory-programmed code that is 20 digits in length. Read/Write transponders allow users to customize identification codes and create or revise data. These transponders use power in the milliwatt range. Operation is unaffected by most types of electrical or physical interference. Other Texas Instruments transponders which may be utilized include the RI-TRP-R9TD(read only 64 bit), RI-TRP-W9TD(64 bit read/write) and RI-TRP-C9TD(Read only 64 bit and read/write 1024 bit).

Similar radio frequency identification systems(RIS) are made by TELSOR Corporation, Englewood, Colo. and Motorola Indala Corporation, Industrial Products Group, San Jose, Calif. These as well as the Texas Instruments and other transponder systems, may be used to provide the identification system or transponder/reader assembly means required by this disclosure.

The transponder is fixed or secured within a stake or other container, suitable for the application, which is driven into the soil, buried or otherwise fixed at the site to be located again in the future. The transponder may be fixed in place by fixing means including as shown here, with a nylon screw inside the stake container, by gluing the transponder in place and by other fixing means.

A Reader Assembly means including for example, as shown herein, a battery powered reader, antenna and framework, operates in a configuration with a computer for portable use and, with a read/write transponder, functions initially to imprint or write into the memory of a the transponder, fixed within a stake or other container, information regarding a particular site and may also be used, following the positioning of the stake or other container, to sweep an area to locate and read the unique transponder code and information so stored. The Reader Assembly means within the preferred embodiment may include the Texas Instruments TIRIS™ Series 2000 Reader System which employs a microprocessor, one or a plurality of antenna means (including as an example, the Texas Instruments TIRIS™ TI-ANT-G92C), service ports including a RS232 connection, memory for data storage and other features. A framework means having handle means may be formed of metal or rigid plastic tubing with suitable mounting and or clamping means for securing the reader and antenna to the framework means. The framework means may also accommodate a keypad or keyboard means and central processing unit(CPU) means, such as but not limited to 80386, 80486 and Pentium chips, display or monitor means and wiring and connectors as required to interconnect the reader with these components. The reader and keypad/keyboard, CPU, monitor and connecting means of course may be contained within a single housing means. Alternative reader assembly means may be provided by the Texas Instruments PEP Easy Reader (RFID) and by reader assembly means provided by other suppliers. A computer program may be used to interpret the information obtained from reading the transponder memory and may be used to direct the writing of information, particular to the site fixed or identified by the buried or otherwise positioned stake or container, into the transponder memory.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 depicts the transponder 1 showing the shape of the transponder employed in the preferred embodiment which is a Texas Instruments RI-TRP-C9QL transponder.

FIG. 2 depicts an exploded view of a Stake Assembly 4, in a stake configuration, consisting of a Stake Transponder Container Cap 10, a Screw 12, a transponder 1, a Stake Transponder Container 7 and a Stake Body 6.

FIG. 3 depicts the Reader Assembly 14 consisting of a reader 22 with internal power supply 23 attached to a framework 27 with a handle 29; an antenna 16 is attached to the framework 27 by a clamp 28; a computer 19 is attached to the framework 27.

DETAILED DESCRIPTION

Figure 4:
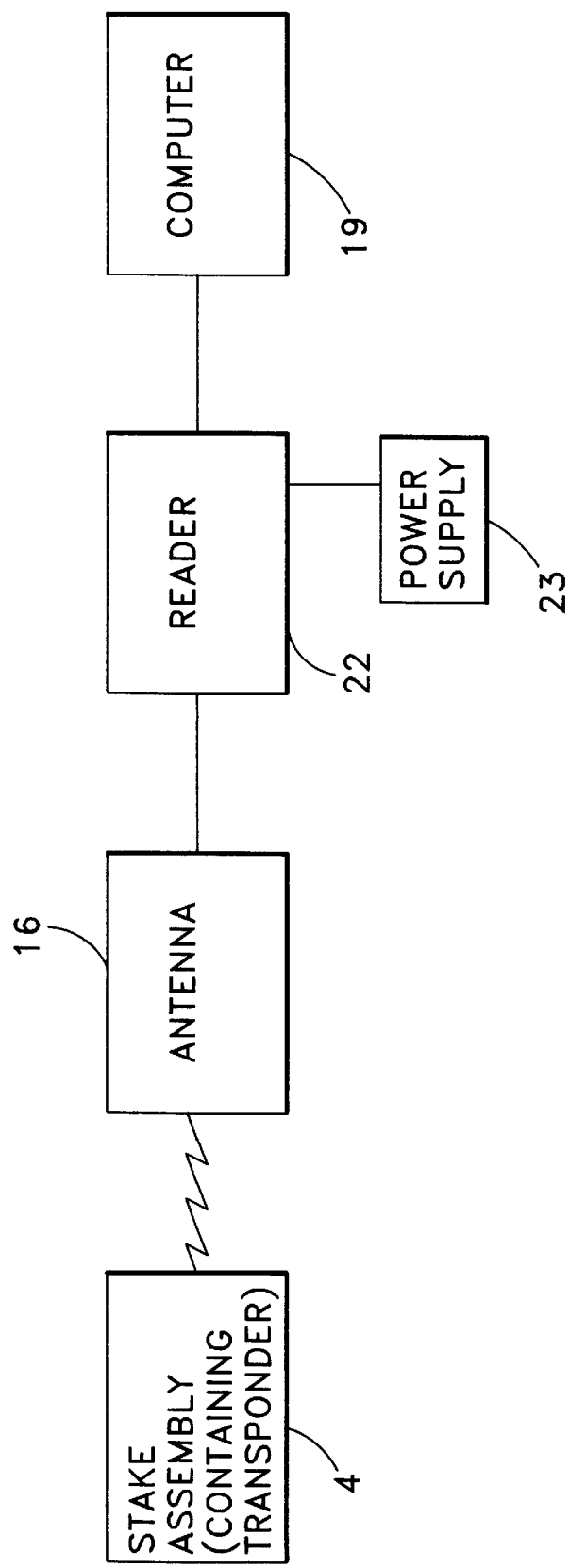
FIG. 4 is a flow chart or schematic showing the relationship of the stake assembly 4 containing a transponder 1 in relation to the Reader Assembly 14 comprised of an Antenna 16, a Reader 22, and Power Supply 23. A Computer 19, depicted in relationship with the Reader 22, may alternatively be fixed to the Framework 27 or incorporated into a common housing with the Reader 22 and Power Supply 23.
Figure 5:
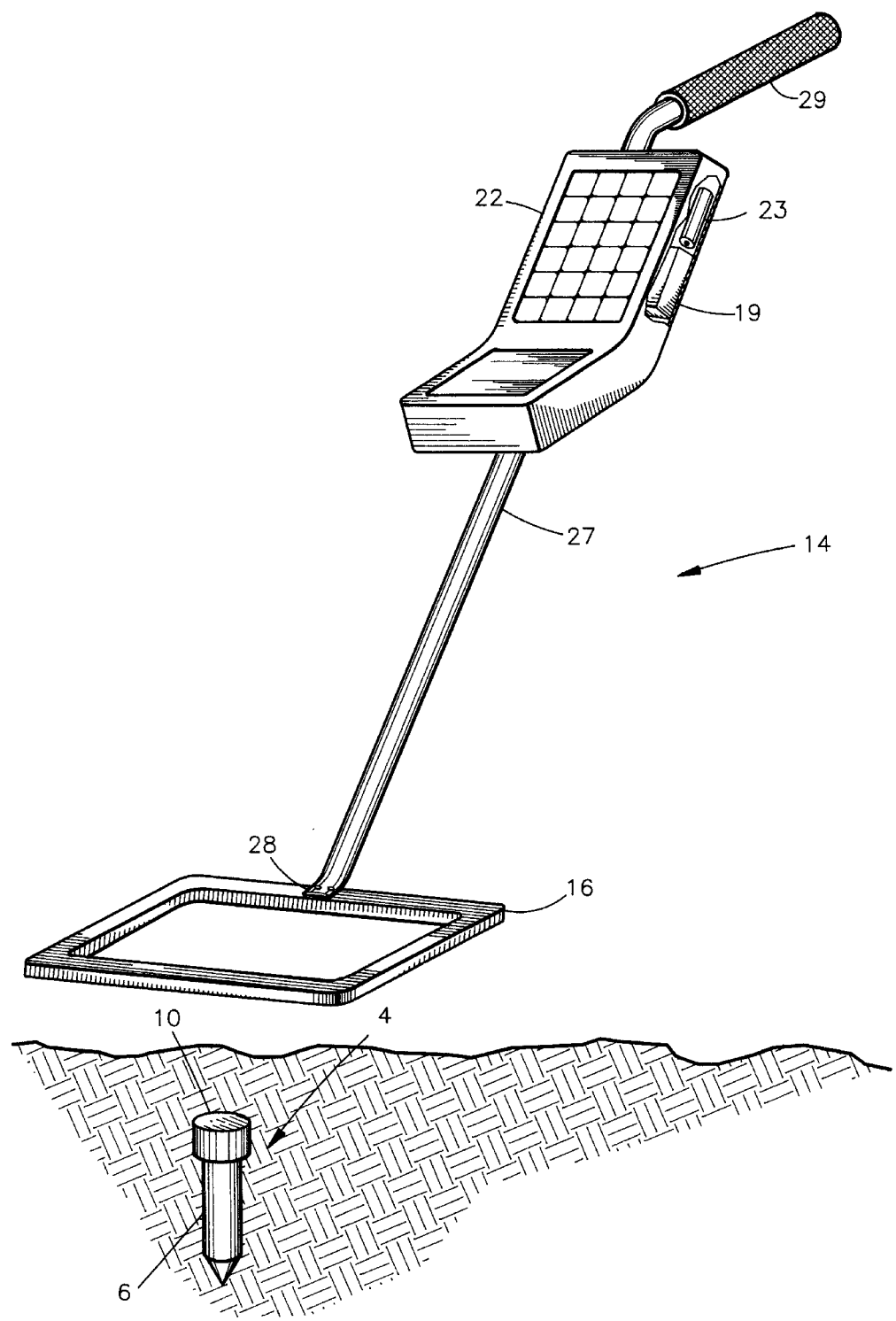
FIG. 5 depicts the Reader Assembly 14 with Antenna 16 proximate to a Stake Assembly 4 demonstrating the positioning of the Antenna 16 relative to the Transponder 1 when scanning the Transponder 1.

The Transponder of FIG. 1, the Stake Assembly 4 of FIG. 2, the Reader Assembly 14 of FIG. 3, the flow chart of FIG. 4 and the Reader Assembly 14 positioning relative to the Transponder 1 container means of FIG. 5 illustrates the preferred embodiment wherein a method is disclosed of marking for the future location and identification of a geographic site. Container means, shown in FIG. 2 as a Stake Assembly 4, is composed of a Stake Body 6 which may be composed of a rigid and durable material suitable to be driven into rocky ground. A non-metallic and non-electrically conductive Stake Transponder Container 7 is affixed to the Stake Body 6 with means and provides a location to which a Transponder 1 may be affixed by means including, as shown in FIG. 2. by a non-metallic nylon screw 12. A Stake Transponder Container Cap 10 covers and encloses the Transponder 1 and is fixed by means, including glue means, to the Stake Transponder Container 7 to provide a water tight compartment. The container means, shown herein as a Stake Assembly 4, will provide a water tight physically protective environment for the Transponder 1.

A Reader Assembly 14, shown in FIG. 3, is composed of an Antenna 16 mechanically linked by a framework means having handle means, shown here as Framework 27 and Handle 29 both of which may be composed of tubular metal or other suitable framework structural material, with a Reader 22 and Power Supply 23. FIG. 4 depicts in a flow diagram format the relationship of the components comprising the principal elements required for the method disclosed herein showing additionally a computer 19 which may be optional.

FIG. 5 demonstrates the relative positioning of the antenna 16 in relation to the transponder 1 container means, shown in a Stake Body 4 configuration, during the sweep process of locating the transponder 1 with the scanner system 14.

The method disclosed herein as the preferred embodiment of the method is the positioning of a Stake Assembly, containing a Transponder, at a geographic site. A Reader Assembly including an Antenna, a Reader, Power Supply and Framework and Handle are arranged so that the Antenna will be passed within the appropriate proximity of the Stake Assembly and hence the Transponder causing, in conjunction with the operation of the Reader, the Transponder to emit data which is received by the Reader and which may be directed to and processed by a Computer. While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A radio frequency transponder method for identifying geographical locations such as survey traverse points comprising the steps of:

positioning a transponder at a geographical location to be identified, the transponder having a memory, the memory being coded with data related to identifying the geographical location at which the transponder is positioned, the memory further being such that the data so coded is retrievable by remote scanning, remotely scanning the geographical location with a transponder activating radio frequency pulse transmitting device, thereby causing the transponder to emit a modulated signal, the signal carrying the geographical location identifying data coded in the memory of the transponder, receiving the modulated signal and the geographical location identifying data using a receiving device, and reading the geographical location identifying data using a reader, thereby identifying the geographical location.

2. A radio frequency transponder method for identifying geographical locations such as survey traverse points according to claim 1 wherein:

container means encloses the Transponder.

3. A radio frequency transponder method for identifying geographical locations such as survey traverse points according to claim 1 wherein:

a container encloses the Transponder; said container comprising a Stake Assembly which is composed of a Stake Body, a Stake Transponder Container affixed to the Stake Body with means and providing a location to which the Transponder is affixed by means, a Stake Transponder Container Cap covers and encloses the Transponder and is fixed by means to the Stake Transponder Container to provide a water tight compartment.

4. A radio frequency transponder method for identifying geographical locations such as survey traverse points according to claim 1 wherein:

a container encloses the Transponder; said container comprising a Stake Assembly which is of a Stake Body which is composed of a rigid and durable material suitable to be driven into various soil types including rocky ground; a non-metallic and non-electrically conductive Stake Transponder Container affixed to the Stake Body with means; the Stake Transponder Container provides a location to which the Transponder is affixed by means including a non-metallic nylon screw; a non-metallic and non-electrically conductive Stake Transponder Container Cap covers and encloses the Transponder and is fixed by means to the Stake Transponder Container to provide a water tight compartment.

5. A radio frequency transponder method for identifying geographical locations such as survey traverse points according to claim 1 wherein:

A. a framework and handle are formed of rigid tubing or other suitable framework structural material with mounting and or clamping means, including a clamp, for securing the reader and antenna to the framework;

B. a computer connected to the Reader Assembly by means; the computer being equipped with a computer program; the computer program being capable of interpreting the data obtained from the transponder memory; the computer program further being capable of directing the writing of information into the transponder memory.

* * * * *